United States Patent
Srinivasan et al.

(10) Patent No.: US 12,170,757 B2
(45) Date of Patent: Dec. 17, 2024

(54) HARDWARE CODEC ACCELERATORS FOR HIGH-PERFORMANCE VIDEO ENCODING

(71) Applicant: NVIDIA Corporation, Santa Clara, CA (US)

(72) Inventors: Ranga Ramanujam Srinivasan, Plano, TX (US); Jianjun Chen, Shanghai (CN); Dong Zhang, Hangzhou (CN); Wei Feng, Shanghai (CN); Xi He, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 375 days.

(21) Appl. No.: 17/451,972

(22) Filed: Oct. 22, 2021

(65) Prior Publication Data

US 2023/0063062 A1    Mar. 2, 2023

Related U.S. Application Data

(63) Continuation of application No. PCT/CN2021/116312, filed on Sep. 2, 2021.

(51) Int. Cl.
| | |
|---|---|
| *H04N 7/12* | (2006.01) |
| *H04N 19/105* | (2014.01) |
| *H04N 19/119* | (2014.01) |
| *H04N 19/12* | (2014.01) |
| *H04N 19/132* | (2014.01) |
| *H04N 19/159* | (2014.01) |

(Continued)

(52) U.S. Cl.
CPC ......... *H04N 19/105* (2014.11); *H04N 19/119* (2014.11); *H04N 19/12* (2014.11); *H04N 19/132* (2014.11); *H04N 19/159* (2014.11); *H04N 19/176* (2014.11); *H04N 19/61* (2014.11)

(58) Field of Classification Search
CPC .... H04N 19/105; H04N 19/119; H04N 19/12; H04N 19/132; H04N 19/159; H04N 19/176; H04N 19/61; H04N 19/136; H04N 19/174
See application file for complete search history.

(56) References Cited

U.S. PATENT DOCUMENTS

| | | | |
|---|---|---|---|
| 8,311,111 B2 * | 11/2012 | Xu | H04N 19/44 375/240.26 |
| 9,432,668 B1 | 8/2016 | Bossen et al. | |
| 9,998,726 B2 * | 6/2018 | Rusanovskyy | H04N 13/161 |

(Continued)

FOREIGN PATENT DOCUMENTS

| | | |
|---|---|---|
| CN | 102150425 A | 8/2011 |
| CN | 104012094 A | 8/2014 |

(Continued)

OTHER PUBLICATIONS

ITU-T; H.266 (Year: 2020).*

(Continued)

*Primary Examiner* — Philip P. Dang
(74) *Attorney, Agent, or Firm* — LOWENSTEIN SANDLER LLP

(57) ABSTRACT

Disclosed are apparatuses, systems, and techniques for real-time codec encoding of video files using hardware-assisted accelerators that utilize a combination of parallel and sequential processing, in which at least a part of intra-frame block prediction is performed with parallel processing.

19 Claims, 8 Drawing Sheets

(51) Int. Cl.
*H04N 19/176* (2014.01)
*H04N 19/61* (2014.01)

(56) References Cited

U.S. PATENT DOCUMENTS

| | | | |
|---|---|---|---|
| 10,070,128 B2 | 9/2018 | Ugur et al. | |
| 10,091,514 B1 | 10/2018 | Bossen et al. | |
| 10,621,731 B1 | 4/2020 | Duenas et al. | |
| 10,687,054 B2* | 6/2020 | Mahdi | H04N 19/14 |
| 10,887,611 B2* | 1/2021 | Seregin | H04N 19/521 |
| 10,999,594 B2* | 5/2021 | Hsieh | H04N 19/176 |
| 11,017,566 B1 | 5/2021 | Tourapis et al. | |
| 11,057,636 B2* | 7/2021 | Huang | H04N 19/42 |
| 11,070,813 B2* | 7/2021 | Socek | H04N 19/137 |
| 11,172,195 B2* | 11/2021 | Seregin | H04N 19/105 |
| 11,197,009 B2* | 12/2021 | Zhang | H04N 19/593 |
| 11,202,070 B2* | 12/2021 | Zhang | H04N 19/105 |
| 11,218,694 B2* | 1/2022 | Seregin | H04N 19/619 |
| 11,272,201 B2* | 3/2022 | Seregin | G06F 9/3867 |
| 11,317,111 B2* | 4/2022 | Rusanovskyy | H04N 19/51 |
| 11,343,504 B2* | 5/2022 | Zhao | H04N 19/597 |
| 11,368,684 B2* | 6/2022 | Seregin | H04N 19/117 |
| 11,388,394 B2* | 7/2022 | Seregin | H04N 19/117 |
| 11,496,746 B2* | 11/2022 | Siddaramanna | H04N 19/46 |
| 11,563,933 B2* | 1/2023 | Seregin | H04N 19/117 |
| 11,582,475 B2* | 2/2023 | Rusanovskyy | H04N 19/52 |
| 11,638,025 B2* | 4/2023 | Pourreza | H04N 19/172 |
| | | | 375/240.12 |
| 11,638,062 B2* | 4/2023 | Stockhammer | H04N 21/26258 |
| | | | 386/278 |
| 11,677,987 B2* | 6/2023 | Said | H04N 19/188 |
| | | | 348/384.1 |
| 2010/0118945 A1* | 5/2010 | Wada | H04N 19/70 |
| | | | 375/E7.246 |
| 2013/0016783 A1 | 1/2013 | Kim et al. | |
| 2013/0101035 A1 | 4/2013 | Wang et al. | |
| 2013/0259142 A1 | 10/2013 | Ikeda et al. | |
| 2014/0198844 A1 | 7/2014 | Hsu et al. | |
| 2015/0229921 A1 | 8/2015 | Chen et al. | |
| 2016/0330445 A1 | 11/2016 | Ugur et al. | |
| 2017/0085886 A1* | 3/2017 | Jacobson | H04N 19/154 |
| 2017/0201769 A1 | 7/2017 | Chon et al. | |
| 2017/0272758 A1 | 9/2017 | Lin et al. | |
| 2020/0021847 A1 | 1/2020 | Kim et al. | |
| 2020/0029096 A1* | 1/2020 | Rusanovskyy | H04N 19/52 |
| 2020/0099926 A1 | 3/2020 | Tanner et al. | |
| 2020/0104976 A1 | 4/2020 | Mammou et al. | |
| 2020/0105024 A1 | 4/2020 | Mammou et al. | |
| 2020/0111237 A1 | 4/2020 | Tourapis et al. | |
| 2020/0204829 A1 | 6/2020 | Stepin et al. | |
| 2020/0288122 A1 | 9/2020 | Kim | |
| 2020/0359022 A1 | 11/2020 | Abe et al. | |
| 2020/0382777 A1 | 12/2020 | Zhang et al. | |
| 2020/0382804 A1 | 12/2020 | Zhang et al. | |
| 2021/0006833 A1 | 1/2021 | Tourapis et al. | |
| 2021/0021809 A1 | 1/2021 | Kim | |
| 2021/0099701 A1 | 4/2021 | Tourapis et al. | |
| 2021/0211661 A1 | 7/2021 | Toma et al. | |
| 2021/0211703 A1 | 7/2021 | Kim et al. | |
| 2021/0211724 A1 | 7/2021 | Kim et al. | |
| 2021/0217203 A1 | 7/2021 | Kim et al. | |
| 2021/0321093 A1 | 10/2021 | Sundaram et al. | |
| 2021/0377868 A1 | 12/2021 | Anand | |
| 2021/0392334 A1* | 12/2021 | Esenlik | H04N 19/82 |
| 2022/0021891 A1 | 1/2022 | Chaudhari et al. | |
| 2022/0256169 A1 | 8/2022 | Siddaramanna et al. | |
| 2022/0277164 A1* | 9/2022 | Malayath | G05D 1/0221 |
| 2022/0279204 A1* | 9/2022 | Malayath | H04N 19/513 |
| 2023/0071018 A1 | 3/2023 | Tang et al. | |

FOREIGN PATENT DOCUMENTS

| | | | |
|---|---|---|---|
| CN | 108449603 A | 8/2018 | |
| CN | 110035290 A | 7/2019 | |
| CN | 111918058 A | 11/2020 | |
| CN | 113301347 A | 8/2021 | |
| JP | 2014127891 A | 7/2014 | |
| WO | 2010030752 A2 | 3/2010 | |
| WO | WO-2012030752 A2 * | 3/2012 | C09G 1/02 |
| WO | WO-2013067903 A1 * | 5/2013 | H04N 19/105 |
| WO | 2019163794 A1 | 8/2019 | |

OTHER PUBLICATIONS

ITU-T; H.265 (Year: 2016).*
Chen, Y. et al., "An Overview of Coding Tools in AV1 Video Codec", 2018 Picture Coding Symposium (PCS), DOI: 10.1109/PCS.2018.8456249, Jun. 24-27, 2018, 5 pages.
Han, J. et al., "A Technical Overview of AV1", arXiv:2008.06091v2 [eess.IV] Feb. 8, 2021, pp. 1-25.
Goebel et al., "Hardware Design of DC/CFL Intra-Prediction Decoder for AV1 Codec," 32nd Symposium of Integrated Circuits and Systems Design (SBCCI), Sao Paulo, Brazil, Aug. 26-30, 2019, pp. 1-6.
International Search Report and Written Opinion for International Application No. PCT/CN2021/116311, mailed May 31, 2022, 6 Pages.
International Search Report and Written Opinion for International Application No. PCT/CN2021/116312, mailed May 26, 2022, 9 Pages.
International Search Report and Written Opinion for International Application No. PCT/CN2021/116711, mailed Apr. 24, 2022, 7 Pages.

* cited by examiner

HARDWARE CODEC ACCELERATORS FOR HIGH-PERFORMANCE VIDEO ENCODING

RELATED APPLICATIONS

This application claims the benefit of priority under 35 U.S.C. 365 to the international application PCT/CN2021/116312, filed Sep. 2, 2021 with the China National Intellectual Property Administration, which is hereby incorporated in its entirety.

TECHNICAL FIELD

At least one embodiment pertains to computational technologies used to perform and facilitate efficient compression of video files. For example, at least one embodiment pertains to operations utilized by hardware video codec accelerators for efficient real-time encoding of high-definition video files using modern video encoding standards that, while offering a large variety of tools and options that enhance video quality, come at the cost of increased computational complexity.

BACKGROUND

A video file in a raw (source) pixel format can occupy a very large memory space and requires a large network bandwidth, which can be impractical for storage and/or livestreaming. For example, a typical high-definition video displays about 30 frames per second, which are typically rather similar to each other. A lot of information in such frames is necessarily redundant, allowing efficient compression. On one hand, relatively minor changes occur between subsequent frames (temporal redundancy). On the other hand, various regions in a given frame are often similar to each other (spatial redundancy), e.g., an image of the sky can extend over a large portion of a frame. As a result, in lieu of transmitting the actual pixel information (luminance and chromaticity) of each pixel, a codec can identify a reference block that is similar to the block being encoded ("predicted") and provide to a decoder a suitable and compact mathematical representation of the difference ("delta") between the actual source block and the predicted block. The reference block can be a block of a different (e.g., previous, or even subsequent) frame, a block of the same frame, or even a synthetic block generated according to some predetermined scheme (mode) based on a small number of reference pixels. Subsequently, instead of storing or livestreaming the actual frame of pixels, the codec can output a bit stream of encoded data, which largely contains instructions to the decoder about how to generate an approximation of the frame whose visual appearance is indistinguishable or very similar to the source frame.

DETAILED DESCRIPTION

Figure 1A:
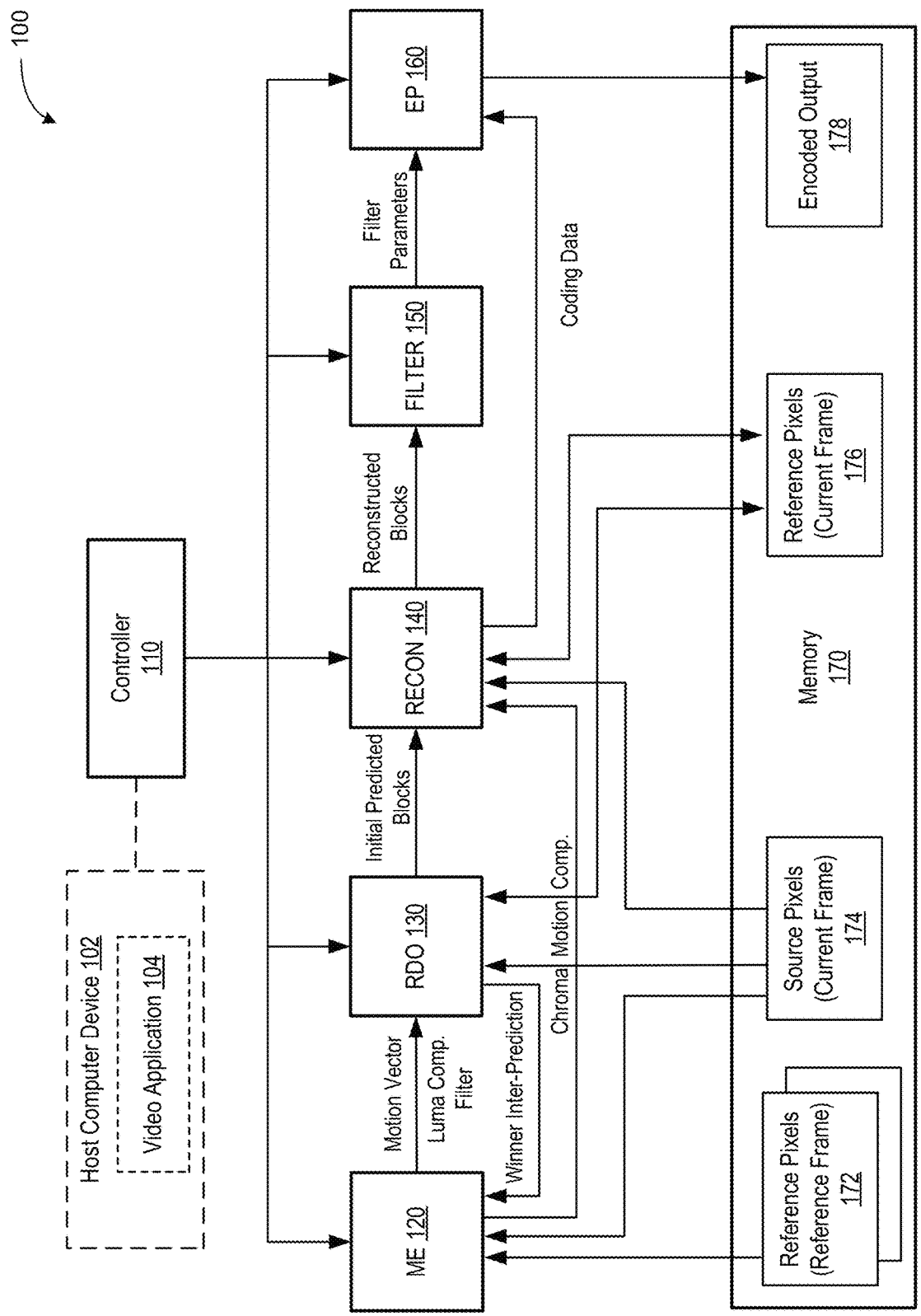
FIG. 1A is a schematic block diagram of an example codec accelerator system used for efficient encoding operations, in accordance with at least some embodiments.

High performance codecs, such as H.264 (Advanced Video Coding or AVC), H.265 (High Efficiency Video Coding or HEVC), and VP9 allow efficient encoding that is based on finding similar blocks in the same frame (referred to as intra-frame prediction) and/or different frames (referred to as inter-frame prediction). Finding intra-frame prediction blocks can be performed along multiple spatial directions (e.g., 8 directions in AVC and 33 directions in HEVC). Likewise, finding inter-frame prediction blocks can be performed with sub-pixel accuracy, in which a vector of translation (rotation, affine transformation, etc.), referred to herein as a motion vector, specifies relative displacement of similar blocks in different frames. Blocks of multiple sizes can be processed to identify best predictions, such as (in HEVC) 64×64 pixel blocks, 32×32 pixel blocks, and 16×16 pixel blocks. Multiple block sizes allow for more efficient encoding (of larger portions of the image(s) that are similar to each other) and finer resolution (of the portions of the image(s) that contain unique details). VP9 standard allows for even greater variety of block sizes, including square blocks 8×8, rectangular blocks of 64×32, 32×64, 32×16, 16×32, 16×8, and 8×16 pixels. Newer codec standards, such as AOMedia Video 1 (AV1), allow even more prediction options. For example, AV1, while inheriting block sizes from VP9, allows for 58 spatial directions for intra-frame predictions. Additionally, AV1 expands on the types of mathematical transforms that can be used to encode residual blocks and numbers and types of filters that can be used to alleviate block boundary artifacts, noise artifacts, motion vector artifacts, and so on.

The increased number of available prediction, encoding, and filtering options facilitates a higher quality video encoding, but comes at a cost of increased computational complexity and processor utilization. Although computational performance in off-line applications can be acceptable, real-time encoding (e.g., for live streaming of high-definition videos) calls for improvements over the existing technology.

A conventional AV1 (or other codecs) encoding software can process various superblocks (e.g., 64×64 or 128×128 pixel blocks) sequentially. For example, starting from the top-left superblock 64×64 of a current frame, the software can partition the superblock into all possible (recognized by the codec standard) partitions. A given partition of the superblock can include blocks of multiple sizes. For example, the top-left quadrant of the superblock can be represented by a single 32×32 block, the top-right quadrant can be partitioned into 16 blocks of 8×8 pixels each, the bottom-left quadrant can be partitioned into 2 blocks of 32×16 pixels, and the bottom-right quadrant can be partitioned into 8 blocks of 16×8 pixels. (Numerous other partition schemes are also selected and evaluated as described below.) Each block (regardless of the size) in the selected partition scheme can then be approximated (predicted) using inter-frame predictions as well as intra-frame predictions.

During the inter-frame predictions, a block that is the most similar to the current block can be identified in one or more reference frames (previous frames and/or subsequent frames). Closely spaced (in time) frames are likely to be similar to each other, with various objects experiencing rather small displacements. As a result, it is often sufficient to explore, in the reference frame(s), a relatively close neighborhood of the current block. The best inter-frame prediction candidate can be selected by minimizing an error value of a cost function that characterizes a difference of the pixels of the inter-frame prediction candidate block and source pixels of the current block.

During the intra-frame predictions, the same block may be approximated based on reference pixels for the block. Typically, reference pixels are boundary pixels of the adjacent blocks (e.g., pixels that are near the top and left boundaries of the current block). Pixels of the current block are inferred from the reference pixels by extrapolation (e.g., from the top row or the left column of reference pixels) or interpolation (from both the top row and the left column) along various directions recognized by the codec standard. Extrapolation or interpolation of pixels of the current block is performed according to specific formulas that depend on the direction (mode) and are defined as part of the codec standard. Similarly to the inter-frame predictions, the best intra-frame prediction candidate(s) can be selected by minimizing the error value of the cost function and based on how well various intra-frame prediction candidates approximate the source pixels of the current block.

The best inter-frame prediction candidate block and the best intra-frame prediction candidate block (generated using the respective winning intra-frame prediction mode) are then compared to each other and the final winner candidate block is selected. The obtained final winner block, generally, has pixels that are different from the source pixels of the current block. The pixel values of the predicted block subtracted from the source block constitute a residual block. Even though the residual block likely has variations of pixel values that are distributed over the entire area of the block, such variations are usually smooth. This means that a discrete Fourier transform (or some other discrete transform) has components that are concentrated near a long-wavelength end of the transform. The short-wavelength end of the transform is much less likely to be perceived by a human eye and can be truncated (using what is known as a quantization transform) resulting in a much lower number of (Fourier) coefficients needed to encode the residual block. Such coefficients constitute a basis (subject to additional filtering and entropy encoding) of the encoded codec bitstream.

Some pixels of the predicted block are used as reference pixels for prediction of the next block, e.g., a neighbor block to the right of the current block and a neighbor block below the current block. Since the decoder receives the truncated Fourier coefficients (rather than the exact residual block), such reference pixels have also to be modified (reconstructed) on the encoder side. More specifically, the application performs a reverse quantization transform followed by an inverse Fourier transform of the truncated distribution and adds the obtained reconstructed residual block to the predicted block to obtain a reconstructed block. The reconstructed block is the same block of pixels that a decoder will subsequently generate (and present to a viewer). Correspondingly, the encoder uses boundary pixels of the reconstructed block as (reconstructed) reference pixels for approximating (predicting) subsequent blocks. The described process is continued until all blocks of the image are predicted and reconstructed.

The described process has multiple inter-dependencies. Reconstruction of superblocks is performed one by one, with processing of the next superblock starting after the previous block is predicted and reconstructed. Additionally, various blocks (which may be of different sizes) inside each superblock have to be similarly predicted and reconstructed. For each superblock, there is a large number of possible block partitions. Furthermore, within each partition, there is a large number of spatial intra-frame prediction modes (directions of interpolation). Such dependencies make deployment of conventional AV1 (and other computationally-heavy) codec embodiments problematic in real-time encoding and streaming applications.

Aspects and embodiments of the present disclosure address these and other technological challenges of real-time video encoding in modern advanced codecs by reducing dependencies encountered in the encoding process. A novel hardware architecture for efficient codec operations is also disclosed. In some embodiments, hardware acceleration of the encoding is achieved by performing sequential processing of consecutive blocks of a current frame while limiting the size of the blocks to a particular subset of recognized block sizes, e.g., to one specific (first) block size. Processing of blocks of the first size can be performed substantially as described above and a set of reconstructed blocks can be obtained. The reconstructed blocks may then be used as a source of reference pixels for processing of all other block sizes, this time in parallel to each other. More specifically, various partitions of each superblock (e.g., 64×64 pixel blocks) may be processed by separate processing threads, concurrently with other superblocks. This parallel processing may determine an optimal partition of each superblock into smaller blocks, the best inter-frame prediction candidate for each block, and one or more best candidate intra-frame prediction interpolation modes for each block.

Subsequent parallel compression of the residual superblocks would generate codec data that is not amenable to decoding, since the decoder operating according to an existing codec standard reconstructs various blocks sequentially. To address this, after parallel processing, the codec accelerator may perform a final sequential reconstruction of the identified best blocks using the reduced number of the identified best candidate modes. Advantages of the disclosed embodiments over the existing technology include significant acceleration of the encoding process. Both the initial and the final sequential processing stages may be performed much faster than done conventionally: the initial sequential processing is limited to a much smaller number of fixed block sizes (e.g., one) while the final sequential processing is limited to the determined block of optimal sizes and a reduced number of best modes for each block.

System Architecture

FIG. 1A is a schematic block diagram of an example codec accelerator system 100 used for efficient encoding operations, in accordance with at least some embodiments.

Codec accelerator system 100 may be a part of or in communication with a host computer device 102, which may be a desktop computer, a laptop computer, a smartphone, a tablet computer, a local server, a cloud server, a dedicated video processing server, a collection of multiple computing devices, a distributed computing system, a smart TV, an augmented reality device, or any other suitable computing device (or collection of computing devices) capable of performing the techniques described herein. Host computer device 102 may include one or more applications, including a video application 104, which may be any application capable of creating or managing video files. For example, video application 104 may be a video camera application, a video gaming application, a movie-making application, a video-streaming application, a social-networking application, or any other application that may create, render, download, receive, and/or process video files, including but not limited to high-definition video files.

As depicted in FIG. 1A, codec accelerator system 100 may include a controller 110 communicatively coupled to a number of components or functional groups, such as a motion estimation group (ME) 120, a rate distortion optimization group (RDO) 130, a reconstruction group (RECON) 140, a filtering group (FILTER) 150, and an entropy processing group (EP) 160. Each functional group may be implemented via one or more electronic circuits. In some embodiments, any functional group may be combined with any other functional group on the same silicon die. In some embodiments, all functional groups may be implemented (together with or separately from controller 110) on the same die. Any or all of the functional groups may be (or include) a number of configurable logic circuits. The logic circuits of any or all functional groups can be configured by controller 110, which may be an application-specific integrated circuit (ASIC), a finite state machine (FSM), a field-programmable gate array (FPGA), a central processing unit (CPU), a graphics processing unit (GPU), or some other processing device, or a combination of the aforementioned processing devices. Various functional groups of codec accelerator system 100 may also be communicatively coupled to a memory 170, which may include one or more memory components, such as cache memory, dynamic randomly addressable memory ("DRAM"), static randomly addressable memory ("SRAM"), non-volatile memory (e.g., flash memory), or some other suitable data storage.

Controller 110 may receive instructions from a host device (not explicitly depicted in FIG. 1A) identifying a video file to be encoded, e.g., by the file's storage location in memory 170. Responsive to receiving the instructions, controller 110 may initialize the functional groups of codec accelerator system 100. Codec accelerator system 100 may process various frames in the video file sequentially. Each frame may be processed using one or more reference frames. Memory 170 may maintain a status register (not explicitly depicted) indicating frames of the video file that are designated as reference frames. Controller 110 or ME 120 may manage (e.g., access and control) the status register and from time to time change designation of reference frames, removing reference designations from some frames and designating other frames as reference frames. In some embodiments, during processing of a current frame, ME 120 may access (receive from memory 170) reference pixels 172 of one or more reference frames, which may include previous frame(s) and/or subsequent frame(s). ME 120 may further access source pixels 174 of the current frame and perform segmentation of the current frame into blocks of various sizes according to the codec standard.

Figure 1B:
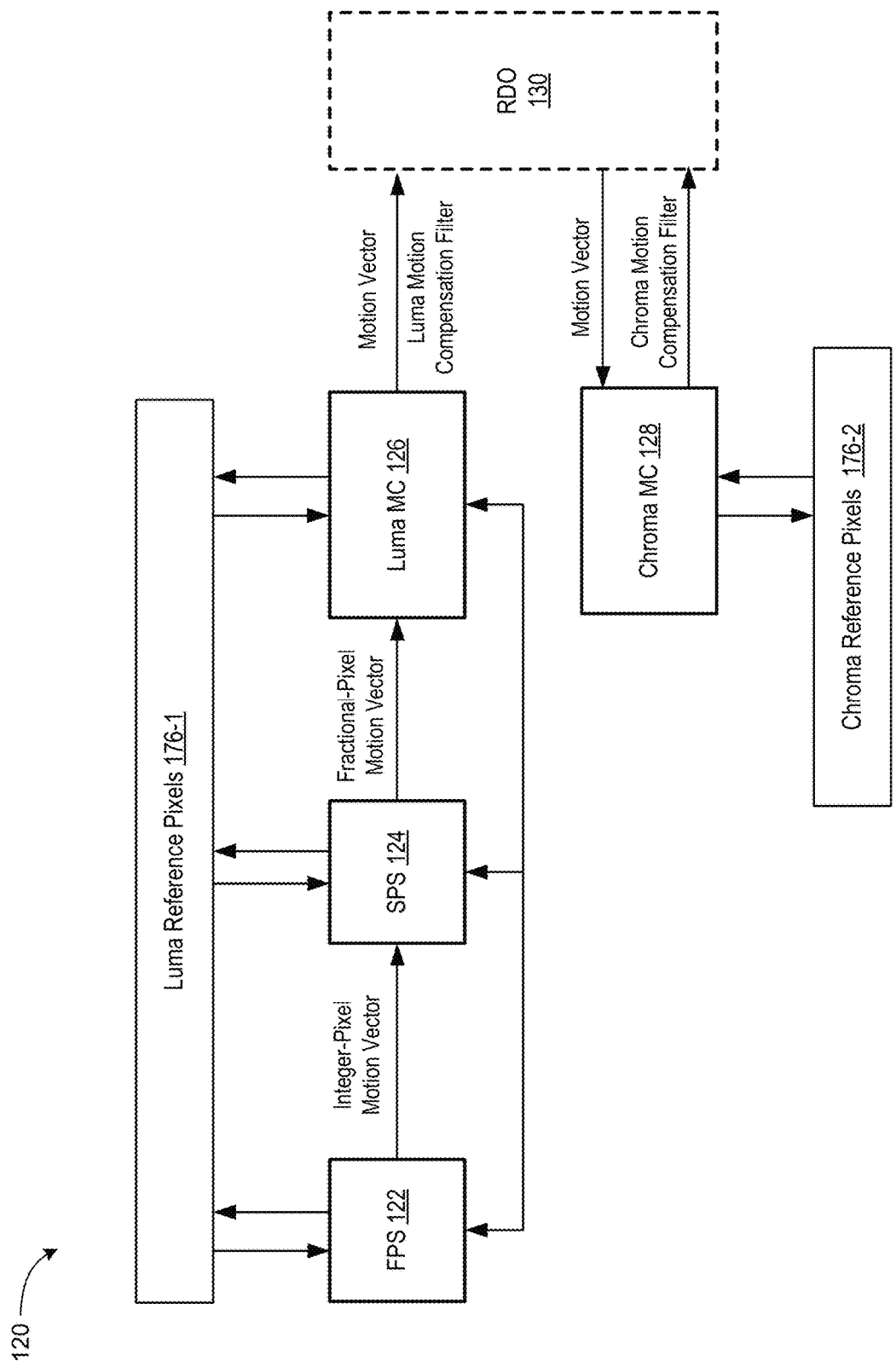
FIG. 1B is a schematic block diagram of a motion estimation functional group of the example codec accelerator system of FIG. 1A, in accordance with at least some embodiments.

FIG. 1B is a schematic diagram of a motion estimation functional group (ME 120) of example codec accelerator system 100 of FIG. 1A, in accordance with at least some embodiments. As depicted in FIG. 1B, ME 120 may include a number of functional circuit blocks that may be implemented via separate circuits. Alternatively, any (or all) of the functional circuit blocks may be implemented on an integrated circuit. For each block of the current frame, ME 120 may identify a motion vector that specifies the motion transformation of the best candidate block (inter-frame predicted candidate) in one of the reference frames into a specific block in the current frame. In some embodiments, the motion transformation may be a translation specified by a two-dimensional vector (X,Y) in units of the number of pixels X and Y along the horizontal and vertical directions. The units may be integer or fractional. In some embodiments, the motion transformation may be an affine transformation that preserves lines and parallelism, but does not necessarily preserve angles or distances. An affine transformation may be specified by a combination of a translation and a matrix transformation of the coordinates.

More specifically, a full pixel search (FPS) functional circuit block 122 may identify a motion vector in terms of integer pixel values X and Y. A sub-pixel search (SPS) functional circuit block 124 may then correct the values X and Y with a fractional pixel accuracy (e.g., ¼ pixel accuracy, ⅙ pixel accuracy, ⅛ pixel accuracy, and so on). In some embodiments, FPS 122 and SPS 124 may determine the motion vector based on pixel brightness (luminance or, simply, luma) data of luma reference pixels 176-1 (e.g., stored in memory 170). The pixel color (chromaticity or, simply, chroma) data may be handled separately, as described below. The determined fractional-pixel motion vector (or, in some embodiments, an integer-pixel motion vector, if a lower resolution is sufficient) may be provided to a luma motion compensation (Luma MC) functional circuit block 126. Luma MC functional circuit block 126 may specify one or more motion compensation filters that are to be applied to the inter-frame prediction candidate block. Luma MC functional circuit block 126 may provide the determined motion vector and filter type information to RDO 130. Determining the motion vector based on luma (rather than both luma and chroma) may save an amount of computation in case the inter-frame prediction block is not selected by RDO 130.

Referring back to FIG. 1A, the information output by ME 120 (e.g., by Luma MC functional circuit block 126) may be received by RDO 130, which performs a dual function of i) performing initial intra-frame block prediction, and ii) comparing the initial intra-frame predictions with an inter-frame prediction generated by ME 120. RDO 130 may then select the best (intra- or inter-) block candidates. More specifically, initial intra-frame predictions may include a sequential processing of the blocks of a first size (e.g., 16×16 pixel blocks or 32×32 pixel blocks) followed by a parallel processing of blocks of various other sizes, as described in more detail below in connection with FIG. 3. During the sequential processing of blocks of the first size, initial reference pixels (reference pixel grid) are generated and stored in memory 170 (reference pixels 176 storage). Initial reference pixels are then used during the parallel processing of blocks of the other sizes.

In some instances, after comparison of the intra-frame with inter-frame predictions, RDO 130 may determine that an inter-frame prediction block is a winner. For example, the inter-frame prediction may have a smaller cost value characterizing a difference between the predicted block and a respective source block. In such instances, the selected inter-frame prediction winner may be returned to ME 120 for additional motion compensation filtering of the winner block's chroma pixel values. Referring again to FIG. 1B, motion vector may be provided to Chroma MC functional circuit block 128. Chroma MC functional circuit block 128 may access chroma reference pixels 176-2, identify a chroma motion compensation filter and communicate the identified filter back to RDO 130. In some embodiments, chroma data may have a reduced (compared to luma) resolution. For example, chroma values (e.g., red and blue chromaticity values, or red and green chromaticity values, or any other suitable chromaticity values) may be defined for each pair of pixels, for each 2×2 block of pixels, for each quad (4×4 block) of pixels, or according to any other suitable scheme. Motion compensation filters may be applied independently from luma filters (previously applied by ME 120) even when the winner inter-frame prediction block was determined on the basis of luma data alone. Referring back to FIG. 1A, in those instances when an inter-frame prediction block is not chosen, the motion vector may not be returned to ME 120 for chroma motion compensation as a winner intra-frame prediction block is provided to RECON 140.

Although, as described above, the motion vector determination may be based on just luma pixels, in other embodiments, motion vector may be determined based on both luma and chroma source pixel data, with luma error, red chroma error, and blue chroma error evaluated using the same or different cost functions. The relative weights assigned to luma and chroma errors may be determined empirically, by testing. Various cost functions may be used, including a sum of absolute transformed differences (SATD), a sum of squared differences (SSD), or other suitable cost functions. For example, selection of a luma motion compensation filter and/or a chroma motion compensation filter (or both) can be performed based on the SSD cost function that characterizes a difference between luma (and/or chroma) source pixel values of the current frame and pixel values of the chosen inter-frame prediction block.

RECON 140 receives predicted blocks from RDO 130 and ME 120. Some of the received predicted blocks may be inter-frame prediction blocks identified (and motion-compensated) by ME 120. Some of the received predicted blocks may be intra-frame predicted blocks. More than one intra-frame predicted block may be received for the same region of the frame. More specifically, an initial predicted block of the first size (e.g., as identified by the initial sequential stage of RDO 130) may be received together with one or more additional candidate blocks of other sizes (e.g., as identified by the parallel processing stage of RDO 130). If intra-frame predicted blocks are received, RECON 140 may first identify a final predicted block (from the received initial predicted block and the additional predicted blocks). Subsequently, RECON 140 performs final block reconstruction, e.g., sequentially, starting from the top-left identified block (or according to some other order, if consistent with the codec standard). Specifically, RECON 140 computes a residual block by subtracting the final predicted block from the source block of the respective size and location. Then, RECON 140 identifies and applies a discrete transform to the residual block to obtain a transformed block, and finally applies a quantization transform to the transformed block. If the winner block is an inter-frame prediction block, RECON 140 may perform the same operations except no final prediction block needs to be identified (as the inter-frame prediction block becomes the final prediction block). The coding data, which includes transformed (and quantized) residual blocks, together with the identification of the final predicted blocks, is communicated to EP 160 for generation of an encoded output 178. The identification of the final predicted block may include the size of the block and the final interpolation mode (in case of the intra-frame final predicted block) or the motion vector (in case of the inter-frame final predicted block).

Similarly, RECON 140 may identify other final predicted blocks and reconstruct these blocks. Boundary pixels of reconstructed blocks become reference pixels for reconstruction of the subsequent blocks and are stored in memory 170. In some embodiments, reference pixels from reconstructed blocks replace, in reference pixels 176 register, initial reference pixel blocks used previously by RDO 130. To match the frame that a decoder is going to obtain from the encoded output 178, reference pixels used by RECON 140 may be the pixels of the reconstructed blocks (that would also be used by the decoder). More specifically, reconstructed blocks may be obtained from the transformed and quantized residual blocks by applying a reverse quantization transform and an inverse discrete transform to obtain reconstructed residual blocks, which are then added to the final predicted blocks. The process is continued until all final predicted blocks are similarly reconstructed.

The set of the reconstructed blocks of the frame may not yet be what is intended to be displayed (on the decoder side) to a viewer. Reconstructed blocks may additionally be processed by FILTER 150 group. FILTER 150 may select from a number of filters recognized by the codec standard being used and further determine various filter parameters to enhance visual quality of the reconstructed blocks, including removal of boundary and other artifacts created during block prediction and reconstruction. In some embodiments, available filters may include a deblocking filter that removes visible block boundaries between neighboring blocks. For example, the deblocking filter may identify the value of discontinuity of luma and/or chroma values across the boundary and spread this value over a number of pixels. The extent of the spread may be among the parameters determined by FILTER 150. Additionally, FILTER 150 may apply a constrained directional enhancement filter (CDEF) to remove ringing artifacts near depictions of sharp edges of various objects. More specifically, because the quantization transform irreversibly reduces or eliminates some short-wavelength harmonics (which are important for imaging of sharp edges), CDEF may compensate for the loss of such harmonics. CDEF may identify most likely direction of edges, e.g., by identifying lines of a constant intensity and lines of the largest intensity gradients. In some embodiments, identification of such lines may be performed by identifying and minimizing SSD for directions that best match directional patterns of the block. After identifying the direction of the block, CDEF may sharpen the depictions of the edges in the block by choosing the filter strength along the determined direction and across this direction. FILTER 150 may also apply a loop restoration (LR) filter to the block. LR filter further improves edge quality and noise reduction using a number of filters, such as a self-guided filter, a Wiener filter, or a combination of the self-guided filter and the Wiener filter. The identified filter parameters (for deblocking, CDEF, LR filters, or other suitable filters, or any combination thereof) are then communicated to EP 160 for inclusion in the encoded output 178.

In some embodiments, to expedite generation of the encoded output 718, FILTER 150 may perform filtering of some superblocks before all blocks inside a given superblock have been reconstructed by RECON 140. For example, if a superblock has a size of 64×64 pixels, FILTER 150 may determine filter parameters based on reconstructed regions of a reduced size, e.g., 48×48 pixels, 48×56 pixels, 48×54 pixels, 52×56 pixels, or some other regions of a reduced size. The regions of the reduced size may be located fully inside a corresponding superblock or may be touching at least one boundary of the superblock. The size of the reduced region may be dynamic, e.g., determined by the sizes of the reconstructed blocks inside the superblocks.

The output of FILTER 150 includes information that is sufficient for a decoder to reproduce the image frame (as well as multiple previous and subsequent frames), including identification of various inter-prediction and intra-prediction blocks, sizes and interpolation modes for these blocks, identification of discrete transforms used to encode the blocks, identification of filters used to improve visual quality of the blocks, and the like. The output of FILTER 150 may be provided to EP 160 for entropy encoding. Specifically, EP 160 may replace each fixed-length input symbol with a variable-length prefix-free output codeword. The length of each codeword may be approximately proportional to the negative logarithm of the probability of occurrence of the codeword so that the most common symbols use represented by the shortest codes. Various coding techniques may be used by EP 160, including Huffman coding and arithmetic coding. The encoded output 178 may be stored in memory 170 and/or livestreamed over Internet or any other suitable network, including a local area network, a wide area network, a personal area network, a public network, a private network, and the like.

In some embodiments, functionality described above is performed by circuit blocks. In another embodiment, some of the functionality (of one or more circuits 120-160) may be implemented in one or more software or firmware modules executed by a processing device, e.g., a central processing unit (CPU), a graphics processing unit (GPU), an field-programmable gate array (FPGA), an application-specific integrated circuit (ASIC), or some other suitable logic device. For example, a first software/firmware module may implement functionality of FILTER 150 and/or a second software/firmware module may implement functionality of EP 160, whereas ME 120, RDO 130, and RECON 140 are implemented via dedicated functional circuit groups. In some embodiments, all of ME 120, RDO 130, RECON 140, FILTER 150, and EP 160 may be implemented as software/firmware modules.

Figure 2:
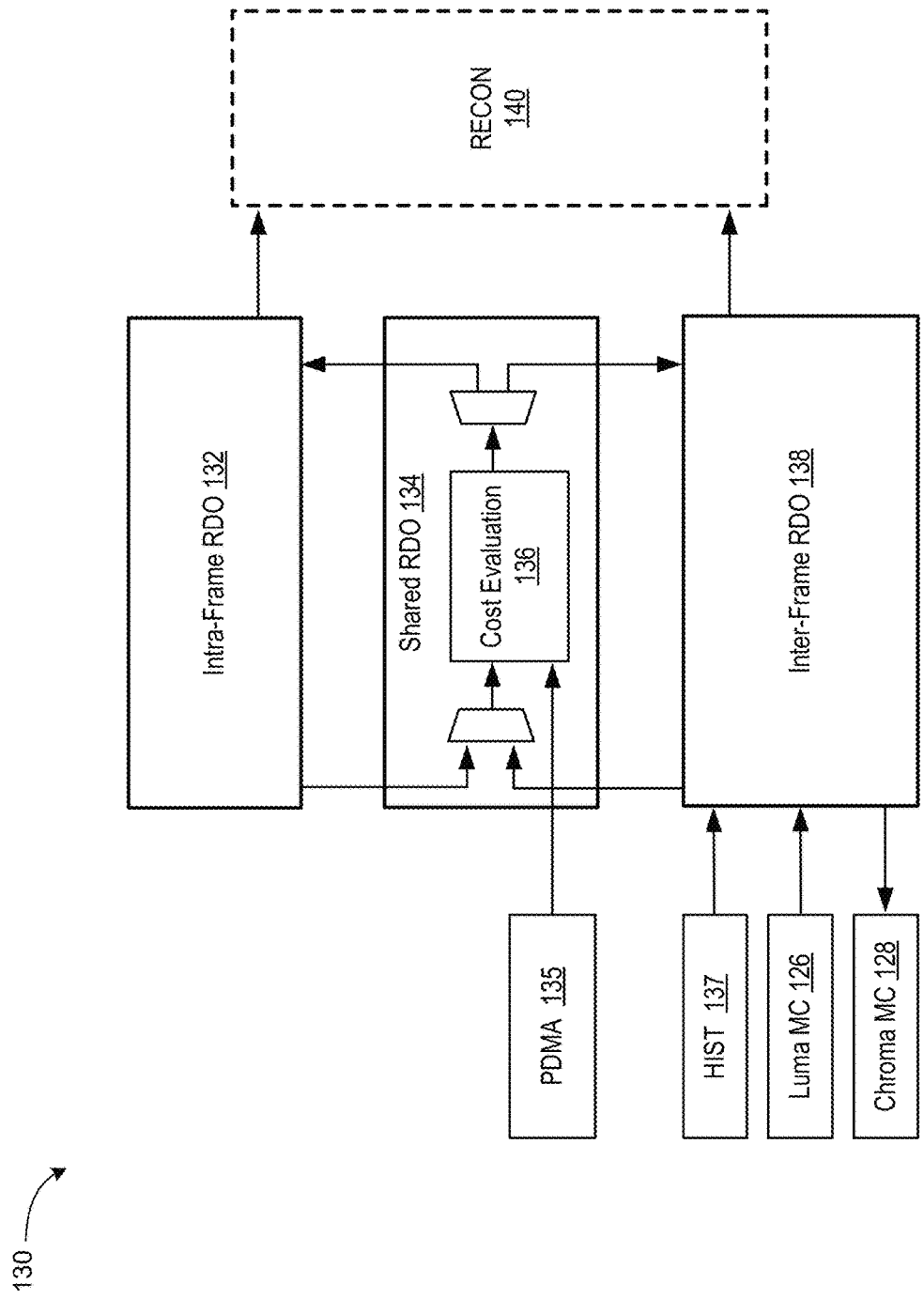
FIG. 2 is a schematic block diagram of a rate-distortion optimization functional group, in accordance with at least some embodiments.

FIG. 2 is a schematic block diagram of a rate-distortion optimization (RDO) functional group, in accordance with at least some embodiments. RDO depicted in FIG. 2 may be RDO 130 of example codec accelerator system 100 of FIG. 1A. As depicted in FIG. 2, RDO 130 may include a number of functional circuit blocks that may be implemented via the same or separate circuits. The functional circuit blocks may include an intra-frame RDO functional circuit block 132, a shared RDO functional circuit block 134, and an inter-frame RDO functional circuit block 138. Intra-frame RDO functional circuit block 132 may apply, using reference pixels, various interpolation modes to a given block of the current image and provide an indication of the predicted block (e.g., interpolated pixel values) to shared RDO functional circuit block 134 for cost evaluation 136. Shared RDO functional circuit block 134 may use peripheral direct memory access controller (PDMA) 135 to access source pixels of the current frame. Cost evaluation 136 may use one or more cost functions (e.g., SATD, SSD, or any other suitable cost function) to evaluate a difference between pixels of the predicted block with pixels of the corresponding source block. Shared RDO 134 may then provide the determined cost value back to intra-frame RDO functional circuit block 132, which may select one or more lowest-cost interpolation modes for further processing by RECON 140.

Inter-frame RDO functional circuit block 138 may use historical data module (HIST) 137 that collects data from previously processed inter-frame prediction blocks for reuse during processing of subsequent blocks (e.g., neighbor blocks). Inter-frame RDO functional circuit block 138 may obtain a motion vector from Luma MC 126 and generate a representation (e.g., pixel values) for the inter-frame predicted block based on the received motion vector. The generated representation may be sent to shared RDO functional circuit block 134 for cost evaluation 136. Shared RDO functional circuit block 134 may use PDMA 135 to access source pixels of the current frame and one or more reference frames. Cost evaluation 136 may evaluate a difference between pixels of the inter-frame predicted block with pixels of the corresponding source block. Shared RDO functional circuit block 134 may then provide the determined cost value back to inter-frame RDO functional circuit block 138. Shared RDO functional circuit block 134 may further perform selection, based on the determined costs, between inter-frame and intra-frame predicted blocks. The winners (the lowest-cost predicted blocks) are then provided for further processing by RECON 140.

Inter-frame RDO functional circuit block 138 may further select a type of a discrete transform to be applied to a difference of pixel values in the selected inter-frame predicted block and the corresponding source pixels of the current frame. The selection may be performed by cost evaluation 136 and may be based on any suitable cost function (e.g., SSD, SATD, etc.). The discrete transform may be invertible and may include Discrete Fourier Transform, Discrete Cosine Transform (DCT), Horizontal DCT, Vertical DCT, Asymmetric Discrete Sine (ADS) Transform, Flipped ADS Transform, Identity Transform (e.g., for imaging of sharp transitions/edges), or any other suitable discrete transform.

Figure 3:
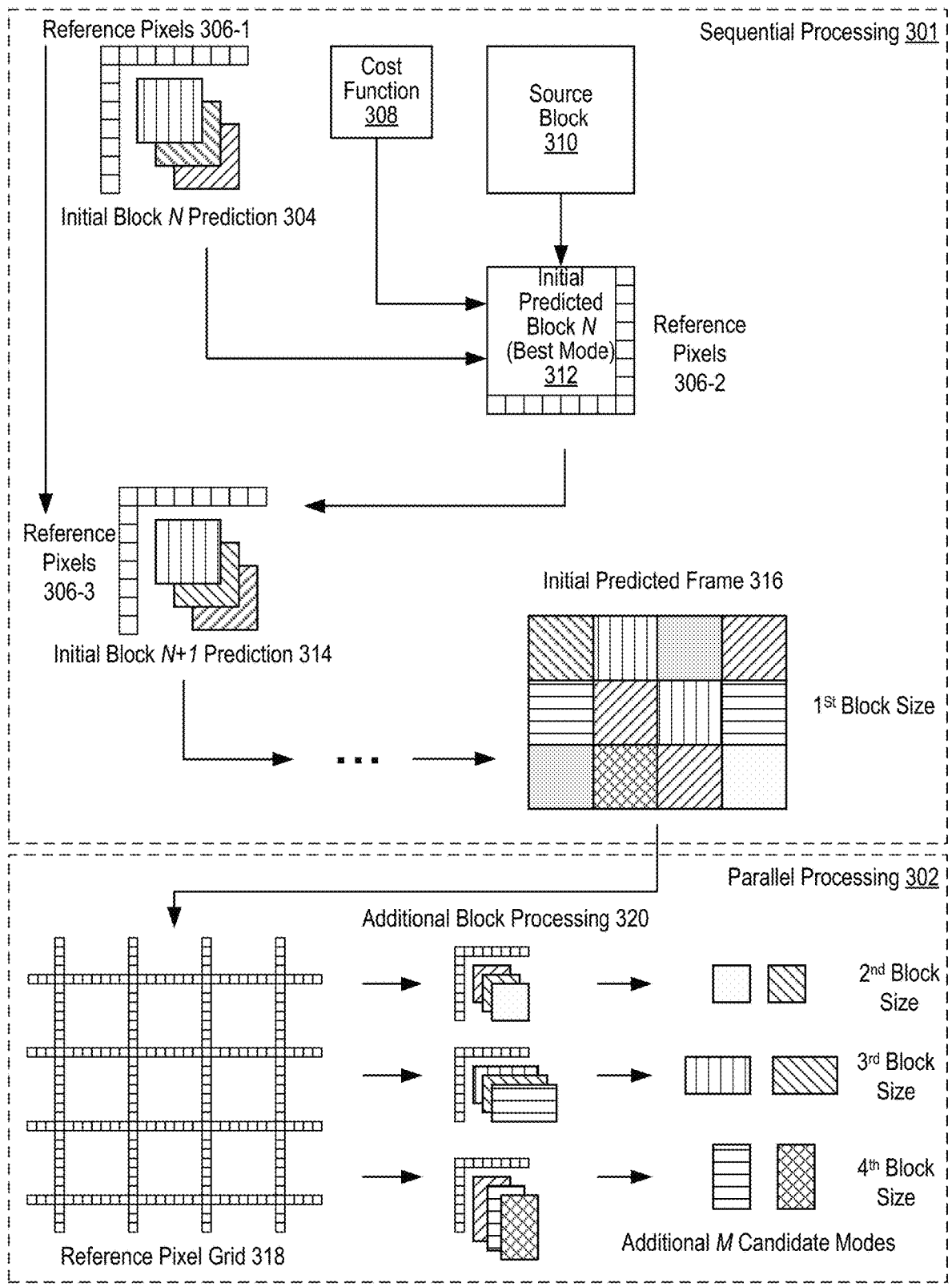
FIG. 3 is a schematic diagram depicting operations of an initial intra-frame sequential processing and parallel processing of a codec accelerator system used for efficient encoding operations, in accordance with at least some embodiments.

FIG. 3 is a schematic diagram depicting operations of an initial intra-frame sequential processing 301 and parallel processing 302 of a codec accelerator system used for efficient encoding operations, in accordance with at least some embodiments. In some embodiments, operations depicted in FIG. 3 may be performed by RDO 130 of example codec accelerator system 100 of FIG. 1A. In some embodiments, operations depicted in FIG. 3 may be performed based on instructions generated by a software or a firmware codec application.

Sequential processing 301 may be performed to identify a reference pixel grid (RGP) 318 which may be used as an input into parallel processing 302. In some embodiments, RPG may include a lattice of pixel lines with a period that is determined by the size of the smallest block recognized by the codec standard. For example, in AV1 embodiments, RPG 318 may be a lattice of pixel lines with a period that corresponds to an 8×8 block (as depicted schematically in FIG. 3). In at least one embodiment, RPG 318 may be identified without sequential processing 301, for example, by selecting source pixels in respective positions into the RPG 318. In those embodiments where sequential processing 301 is performed, sequential processing 301 may involve blocks of any size recognized by the codec standard (referred to herein as the first size), e.g., 16×16 blocks, 8×8 blocks, 32×32 blocks, etc., although blocks of any other size may be used instead or in addition to the blocks of the first size. In some embodiments, the first size may refer to rectangular blocks, e.g., 8×16 blocks or 16×32 blocks, or any other suitable block size. In some embodiments, the first size may be selected based on the type and context of the video being encoded. Smaller blocks may be favored when a higher detail resolution is desired while larger-sized blocks may be used when computational costs are to be minimized.

Depicted schematically in FIG. 3 is initial prediction of block N 304. Block N may be any block of the first size in the current frame. The output of the initial prediction is an initial predicted block N 312. Prediction is performed using reference pixels 306-1, which may include some of the reference pixels determined in the course of prediction of preceding blocks 1 . . . N−1. Reference pixels 306-1 may include pixels that are on the left/top side of block N (although some other suitable pixels can be used as reference pixels). In those instances where blocks on the left/top side of block N are yet to be processed, some of the reference pixels 306-1 may be source pixels or pixels having some pre-determined values (e.g., values at 50% of the maximum intensity). Initial block N prediction 304 may include evaluating a number of available intra prediction modes, including but not limited to a vertical mode (in which predicted pixels are extrapolated in the downward vertical direction from the top row of reference pixels 306-1), a horizontal mode (in which predicted pixels are extrapolated in the rightward horizontal direction from the left column of reference pixels 306-1), a planar mode (in which predicted pixels are interpolated from both the top row and the left column of reference pixels 306-1), a DC mode (in which predicted pixels are the average of pixels of the top row and the left column of reference pixels 306-1, and a number of angular modes (in which predicted pixels are extrapolated from either the top row or the left column of reference pixels 306-1 or a combination of the top row and the left column of reference pixels 306-1), and so on. In some embodiments, all possible modes recognized by the codec standard may be evaluated whereas in other embodiments only a subset of all possible modes may be evaluated (e.g., a subset of 28 of 56 angular modes of the AV1 standard may be evaluated).

Blocks predicted using different interpolation modes are depicted in FIG. 3 with different shading patterns. Evaluation of such modes may be performed using a cost function 308, which may be SATD, SSD, or any other suitable cost function. Cost function 308 may be used to compare (e.g., pixel-by-pixel) a block N predicted using a particular interpolation mode with a respective source block 310 of the current frame. Based on the results of the comparison, a best mode may be selected for the initial predicted block N 312. A subset of pixels of the predicted block, e.g., reference pixels 306-2, may be used for prediction of subsequent blocks (and may be included into RPG 318). Reference pixels 306-2 may be the right boundary pixels (e.g. to be used in prediction of the right neighbor of block N) and/or the bottom boundary pixels (e.g., to be used in prediction of the bottom neighbor of block N). Some of reference pixels 306-2 added to some of reference pixels 306-1 may be used as reference pixels 306-3 for the initial prediction of block N+1 314. This process may be continued until the entire frame is predicted. This initial predicted frame 316, segmented into the predicted blocks of the first size, may then be used as an input into parallel processing 302.

Parallel processing 302 may use RPG 318 of the initial predicted frame 316. RPG 318 may include pixels of the initial predicted frame 316 located along the gridlines of RPG 318 (e.g., along the boundaries of the smallest size blocks, such as 8×8 blocks). Additional block processing 320 may then be performed in parallel using pixels of RPG 318 as reference pixels. The processing may be performed similarly to the processing described above in conjunction with 304-312, with one difference that reference pixels are not being updated. Blocks of each (second, third, fourth, etc.) size may be processed using at least some (or, in some embodiments, all) interpolation modes recognized by the codec standard. For each size, a predetermined number M of top candidate interpolation modes may be selected, where the top candidate modes are selected based on having a lower cost as determined by a cost function. A cost function used for evaluating the modes may be SATD, SSD, or any other suitable cost function. In some embodiments, blocks of the first size are not re-evaluated during additional block processing 320. In such embodiments, the output of the intra-frame RDO processing depicted in FIG. 3 includes one best mode for the blocks of the first size and M (top) candidate modes for each of the other sizes. In some embodiments, additional processing of blocks of the first size may further be performed and M top candidates for each block of all sizes (including the first size) are being output. In some embodiments, M=2 or M=3, even though in other embodiments a significantly larger number of candidate modes may be output. Different blocks of even the same size may have different candidate modes. For example, a particular block of 16×8 size may have a horizontal mode, a planar mode, and a DC mode as the candidate modes whereas a neighbor block of the same 16×8 size located immediately above may have a vertical mode and two angular modes as the candidate modes.

It should be understood that only intra-frame prediction operations are depicted in FIG. 3. As described above in conjunction with FIG. 1A, FIG. 1B, and FIG. 2, selection among the intra-frame candidate modes and the inter-frame candidate may be subsequently performed by RDO 130 before RECON 140 group performs the final block reconstruction as described below in connection with FIG. 4.

Figure 4:
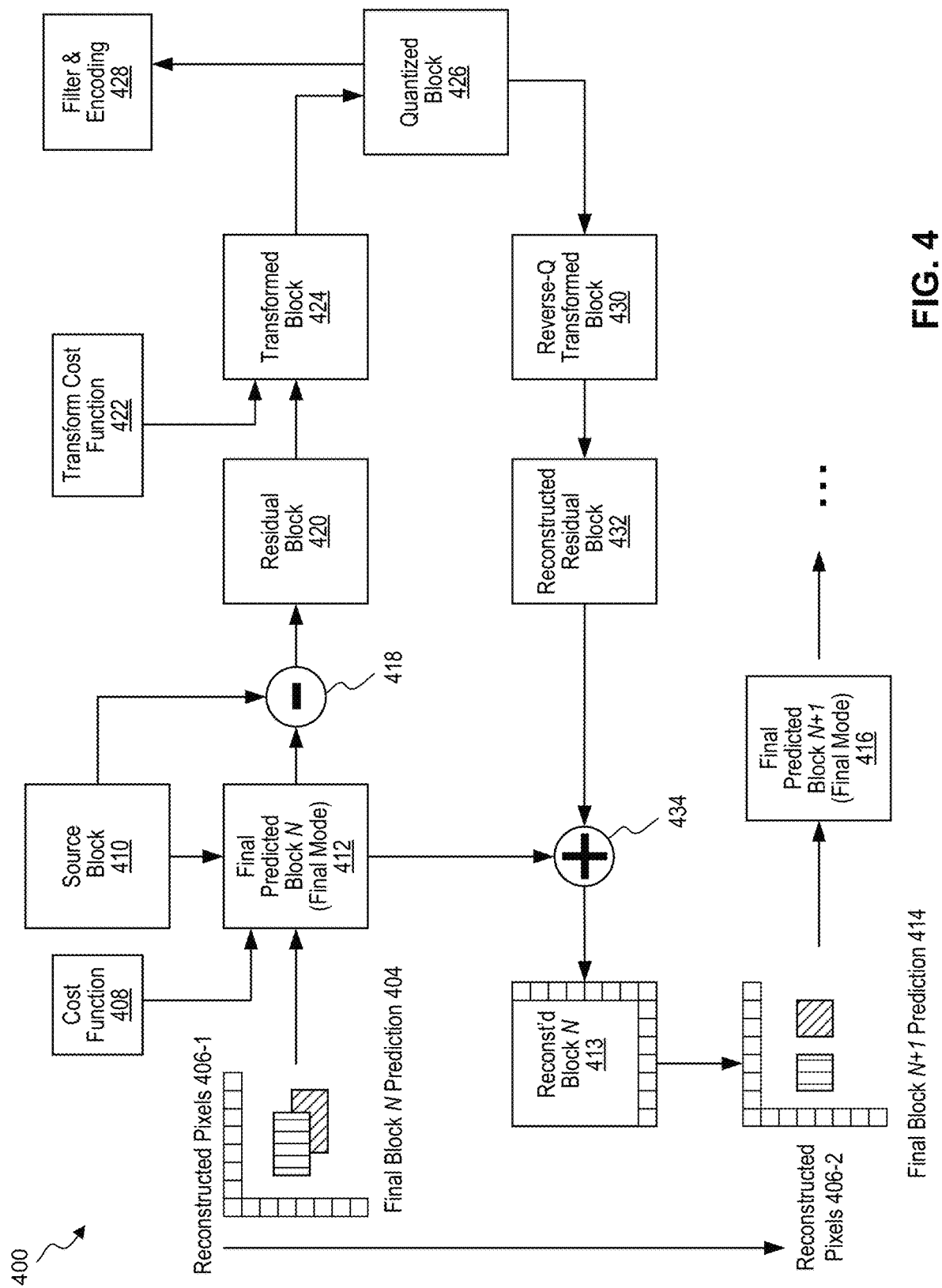
FIG. 4 is a schematic diagram depicting operations of a final intra-frame processing of a codec accelerator system used for efficient encoding operations, in accordance with at least some embodiments.

FIG. 4 is a schematic diagram depicting operations of a final intra-frame processing 400 of a codec accelerator system used for efficient encoding operations, in accordance with at least some embodiments. In some embodiments, operations depicted in FIG. 4 may be performed by RECON 140 of example codec accelerator system 100 of FIG. 1. In some embodiments, operations depicted in FIG. 4 may be performed by a general CPU(s) or GPU(s) based on instructions generated by a software or a firmware codec application.

After parallel processing 302 of FIG. 3 has identified top M candidate modes (each associated with a particular predicted block also referred herein to as a candidate block) for each block of the current image, those modes that have not been eliminated in favor of inter-frame prediction candidates may undergo final intra-frame processing 400. As depicted schematically in FIG. 4, final prediction of a block N 404 may be performed using reconstructed (reference) pixels 406-1, which may include some of the reconstructed pixels determined in the course of reconstruction of preceding final blocks 1 . . . N−1. It should be understood that even though the same symbol N is used to enumerate blocks in FIG. 4 and FIG. 3, blocks reconstructed as part of final intra-frame processing 400 may be different from the blocks predicted as part of sequential processing 301. In particular, blocks of different (e.g., all) sizes may be reconstructed during the final intra-frame processing 400.

Reconstructed pixels 406-1 may include pixels that are on the left/top side of the block N (or other suitable reference pixels, as may be specified by the codec standard). In those instances where blocks on the left/top side of block N are yet to be reconstructed, some of the reconstructed pixels 406-1 may be source pixels or reference pixels 306-1, 306-2, 306-3, etc., obtained during sequential processing 301. Prediction of final block N (404) may include evaluating M remaining candidates output by the parallel processing 302, as well as the best mode for the blocks of the first size, determined during sequential processing 301 (in those embodiments where no additional modes are identified for the blocks of the first size). In some embodiments, prediction of final block N (404) may also include evaluating interpolation modes not previously evaluated during parallel processing 302 or sequential processing 301.

Various candidate modes may be selected using a cost function 408, which may be the same or different than cost function 308 in FIG. 3. In some embodiments, cost function 308 may be SATD-based cost function whereas cost function 408 may be SSD-based cost function (or vice versa). Cost function 408 may be used to compare (e.g., pixel-by-pixel) a final block candidate computed using a given candidate mode with a respective source block 410 of the current frame. Although source block 410 is depicted as a square, a rectangular source block of the corresponding size may be used for reconstruction if block N is rectangular.

Based on the results of the comparison, a final mode may be selected for the final predicted block N 412. Subsequently, RECON 140 (or any other suitable device performing final intra-frame processing 400) performs a final block reconstruction, e.g., sequentially, starting from the top-left block (of in some other order recognized by the codec standard). Specifically, final predicted block N 412 may be subtracted (operation 418) from the corresponding source block 410 of the respective size and location. Subtraction is performed pixel-by-pixel and a residual block 420 is obtained, $\Delta(x,y)=Source(x,y)-Pred.Block(x,y)$. Subsequently, RECON 140 (or other suitable device) selects and performs a discrete transform of the residual block 420. Discrete transforms may be invertible and may include Discrete Fourier Transform, Discrete Cosine Transform (DCT), Horizontal DCT, Vertical DCT, Asymmetric Discrete Sine (ADS) Transform, Flipped ADS Transform, Identity Transform (e.g., for imaging of sharp transitions/edges), or any other suitable discrete transform. Transforms may be selected using a transform cost function 422. The selected transform is used to produce a transformed (residual) block 424, $\Delta(x,y) \rightarrow \Delta(k_x,k_y)$. Subsequently, a (forward) quantization transform may be applied to transformed block 424 to obtain quantized block 426, $\Delta(k_x,k_y) \rightarrow \Delta_Q(k_x,k_y)$. The quantization transform can be irreversible and, in some embodiments, may include dividing the transformed block 424 (element-by-element) by a table of quantization coefficients with a subsequent rounding operation applied to the result of the division operation. As a consequence, small components of the transformed block 424 may turn to zero, such that the quantized block 426 includes fewer (in some instances much fewer) nonzero elements than the transformed block 424.

The quantized block, together with other coding data may be provided for filtering and encoding (428), e.g., by FILTER 150 and EP 160 of example code accelerator system 100 of FIG. 1A. The other coding data may include the identification of the final predicted block including the size and the location of the block, the identification of the type of the prediction used (inter-frame or intra-frame), the motion vector and the motion compensation filters (for inter-frame predictions), the final interpolation mode (for intra-frame predictions), the type of the discrete transform being used, the identification of the table of quantization coefficients, and various other data.

The quantized block 426 $\Delta_Q(k_x,k_y)$ may then be used to obtain a reconstructed block N 413. RECON 140 (or some other device performing final intra-frame processing 400) may perform a reverse quantization transform to obtain a reverse-quantized transformed block 430. The reverse quantization transform may include multiplying quantized block 426 (e.g., element-by-element) by the table of quantization coefficients. Because of the rounding performed during the forward quantization transform, the reverse-quantized transformed block 430, $\Delta'(k_x,k_y)$, does not in general coincide with the transformed block 424, $\Delta(k_x,k_y)$. Application of the inverse discrete transform to the reverse-quantized transformed block 430, $\Delta'(k_x,k_y) \rightarrow \Delta'(x,y)$, therefore, generates a reconstructed residual block 432, $\Delta'(x,y)$, that is different from the residual block 420, $\Delta(x,y)$. Reconstructed residual block 432 may then be added (operation 434) to the final predicted block N 412 to obtain reconstructed block N 413, e.g., as follows, Recon.Block(x,y)=Pred.Block(x,y)+$\Delta'(x,y)$.

Similarly to the boundary pixels of predicted blocks 304 and 314 in FIG. 3, some of the boundary pixels of reconstructed block N 413 become reference pixels for reconstruction of the subsequent blocks. For example, a subset of pixels of the reconstructed block N 413 (e.g., the bottom row and the rightmost column of the reconstructed block) may be used as reconstructed (reference) pixels 406-2 for a final block N+1 prediction 414. The final predicted block N+1 416 may be processed similarly to processing of block N. The described process may be continued until the entire frame is reconstructed.

Figure 5A:
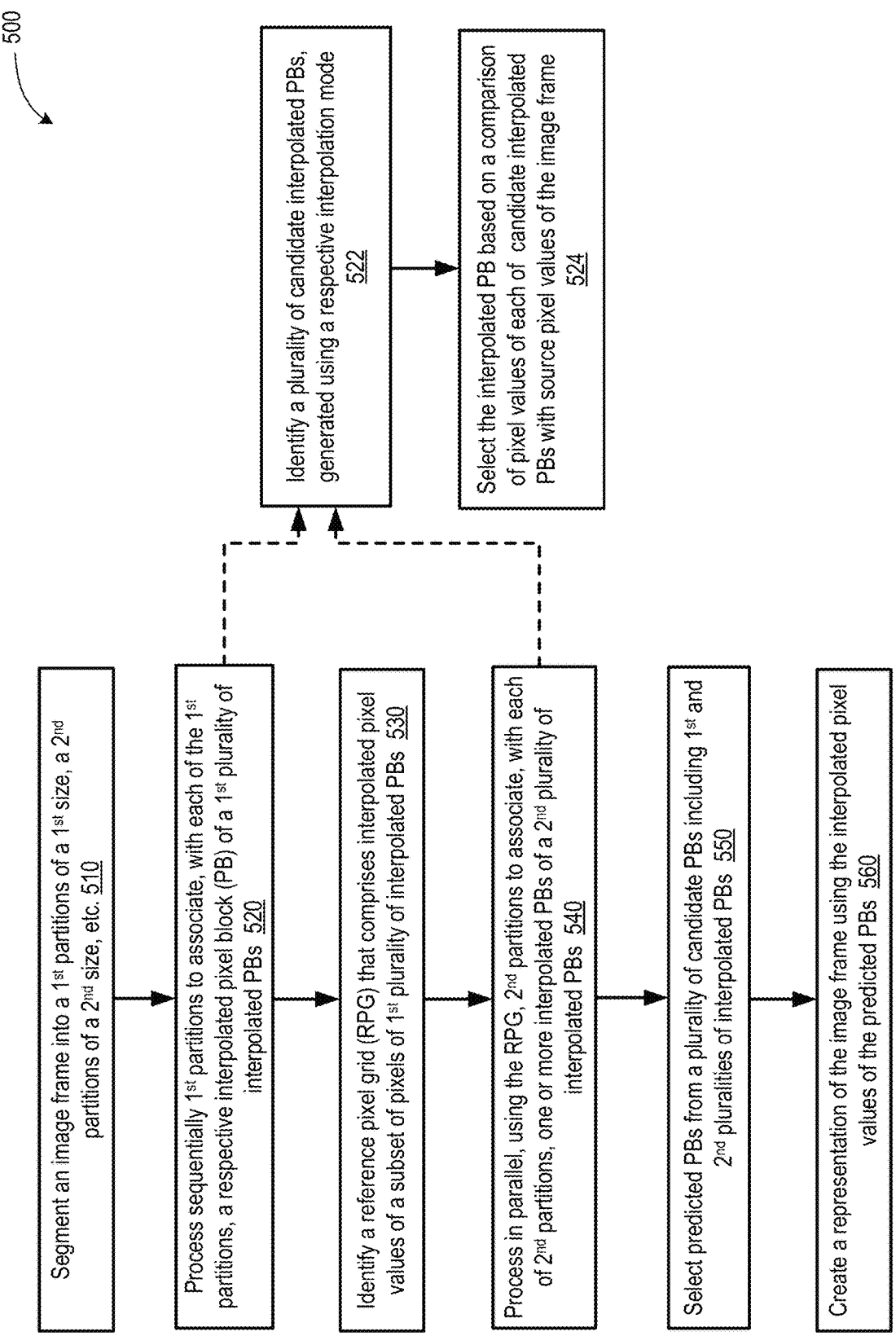
FIG. 5A is a flow diagram of an example method of real-time compression encoding of video files using hardware parallel processing, in accordance with at least some embodiments.
Figure 5B:
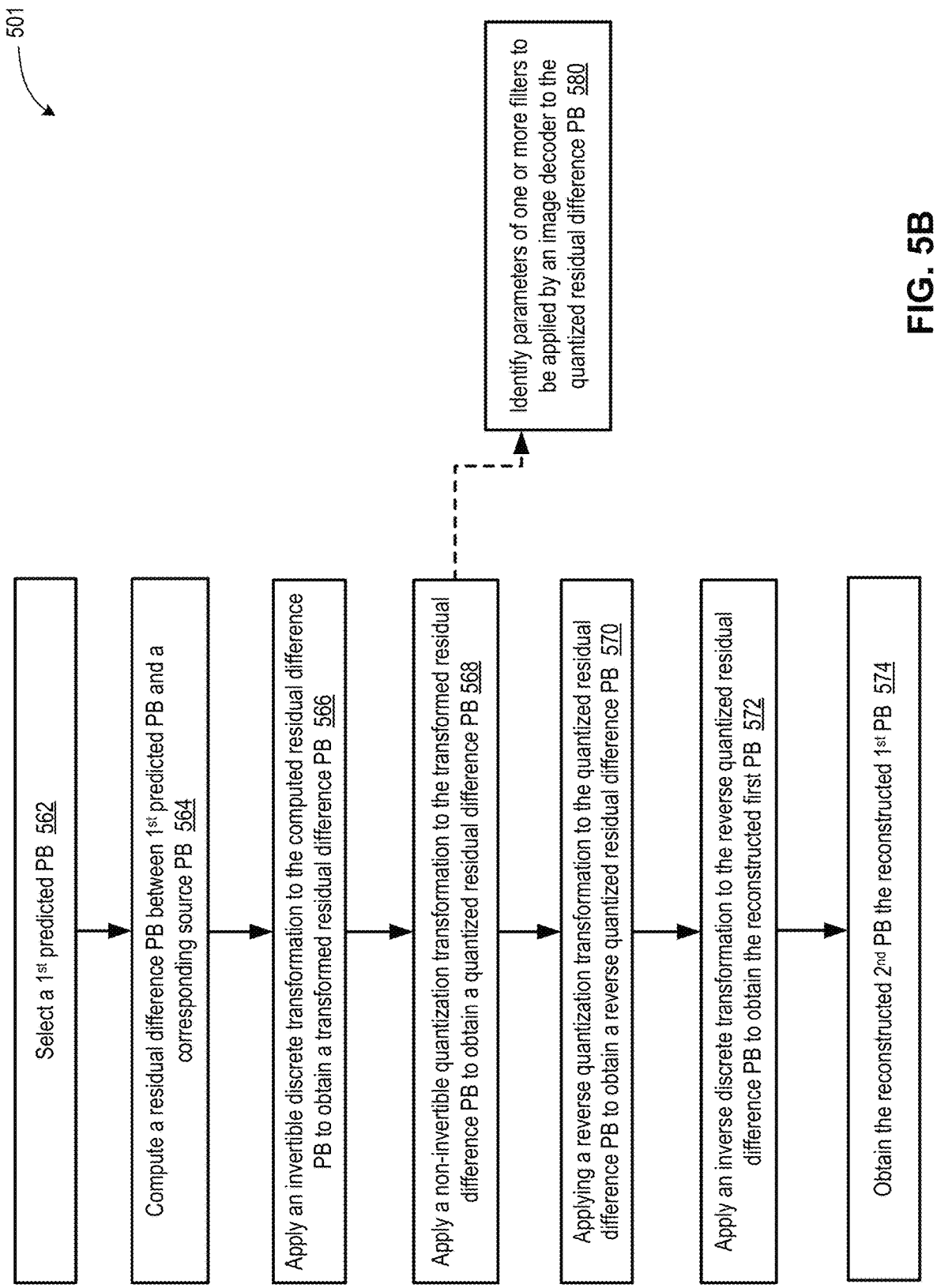
FIG. 5B is a flow diagram of an example method of reconstruction of predicted PBs for efficient real-time compression encoding of video files, in accordance with at least some embodiments.
Figure 6:
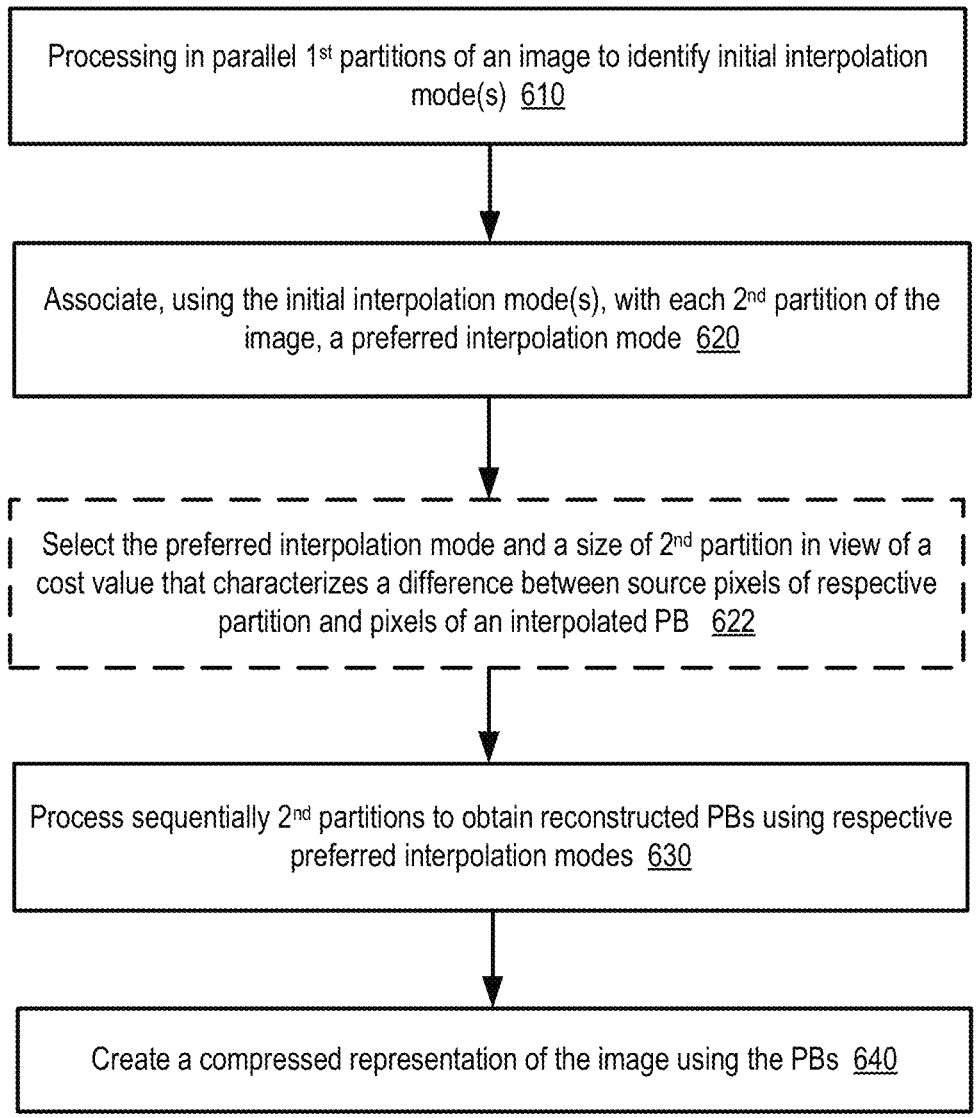
FIG. 6 is a flow diagram of another example method of real-time compression encoding of video files using hardware parallel processing, in accordance with at least some embodiments.

FIG. 5A, FIG. 5B, and FIG. 6 are flow diagrams of example methods 500, 501, and 600, respectively, of acceleration of video codec operations, in accordance with at least some embodiments. In some embodiments, methods 500, 501, and 600 may be performed by the example codec accelerator system 100 of FIG. 1A. In some embodiments, methods 500, 501, and 600 may be performed by one or more circuits that may communicate with one or more memory devices. In some embodiments, at least some operations of methods 500, 501, and 600 may be performed by multiple (e.g., parallel) hardware threads, each thread executing one or more individual functions, routines, subroutines, or operations of the methods. In some embodiments, processing threads implementing methods 500 and 600 may be synchronized (e.g., using semaphores, critical sections, and/or other thread synchronization mechanisms). Alternatively, hardware threads implementing methods 500, 501, and 600 may be executed asynchronously with respect to each other. Various operations of methods 500, 501, and 600 may be performed in a different order compared with the order shown in FIG. 5A, FIG. 5B, and FIG. 6. Some operations of methods 500, 501, and 600 may be performed concurrently with other operations. In some embodiments, one or more operations shown in FIG. 5A, FIG. 5B, and FIG. 6 may not be performed.

FIG. 5A is a flow diagram of an example method 500 of real-time compression encoding of video files using hardware parallel processing, in accordance with at least some embodiments. Method 500 may be performed to encode a video file in an AV1 codec format, a VP9 codec format, or any other suitable video codec format. A video file may include multiple image frames. Method 500 may include sequential and parallel processing of various blocks (partitions) of image frames. The description below of operations of method 500 is illustrated using an example image frame, but it should be understood that other frames of the video files may be processed similarly. One or more circuits performing method 500 may segment, at block 510, an image frame of the video file into a first plurality of partitions of a first size. For example, the first size may be measured in pixels and may refer to 16×16 pixels, 32×32 pixels, 8×8 pixels, etc. In some embodiments, the first size may be non-square (e.g., rectangular), e.g., 16×8 pixels, 64×16 pixels, etc. The first plurality of partitions may be used for an initial (e.g., sequential) processing of the image frame. Additionally, the image frame may be segmented into a second plurality of partitions of a second size. Herein, "partitions of a second size" may refer to partitions of any size different from the first size, including, collectively, to partitions of multiple sizes, e.g., 32×32 pixel partitions, 32×16 pixel partitions, 8×16 pixel partitions, as well as any other partitions recognized by the codec specification.

At block 520, method 500 may continue with the one or more circuits processing sequentially the first plurality of partitions to associate, with each of the first plurality of partitions, a respective interpolated pixel block (PB) of a first plurality of interpolated PBs (e.g., blocks of the initial predicted frame 316 in FIG. 3). For example, for each partition (e.g., 16×16 pixels) of the image frame, a number of interpolation modes (e.g., defined by the codec specification) may be evaluated. As depicted with the upper dashed arrow in FIG. 5A, processing the first plurality of partitions may include identifying a plurality of candidate interpolated PBs. Each of the plurality of candidate interpolated PBs may be generated using a respective interpolation mode of a plurality of interpolation modes and based on a set of reference pixels for the partition. For example, each of the DC mode, planar mode, horizontal mode, vertical mode, any of the angular modes, and the like, may generate a different interpolated PB. As used herein, the term "interpolation" should be understood to encompass any way of inferring pixel value of a PB based on a set of reference pixels (e.g., such as pixels of neighbor blocks located near a boundary of the PB), including interpolation, extrapolation, averaging, and/or using any suitable mathematical formula or scheme.

As depicted by block 524, upon generation of the one or more interpolation PBs, the one or more circuits may identify and select the best interpolation mode that generates the interpolation PB having interpolated pixel values that most closely approximate the source pixel values of the respective block of the same size and positioned at the same location of the image frame. The selection of the best mode may be based on a comparison of pixel values of each of the plurality of candidate interpolated PBs with source pixel values of the image frame and may be facilitated by a suitable choice of a cost function, e.g., SATD cost function, SSD cost function, and the like.

At block 530, method 500 may continue with the one or more circuits identifying a reference pixel grid (RPG) that includes interpolated pixel values of a subset of pixels of the first plurality of interpolated PBs. For example, the RPG may be a grid of pixels located along horizontal and vertical lines periodically spaced with a period that corresponds to a minimum block size of the codec specification, e.g., 8×8 pixels. In some embodiments, the pixels of RPG may be pixels that are adjacent to boundary lines of the segmentation of the image frame into partitions of the minimum block size (or any other pixels that may be recognized by the codec standard as reference pixels).

At block 540, method 500 may continue with the one or more circuits processing in parallel, using the RPG, the second plurality of partitions. The second plurality of partitions may be performed in parallel by multiple hardware processing threads. For example, the one or more circuits may process partitions of all sizes in parallel, using the RPG as a reference grip for further pixel interpolation. The parallel processing may be performed to associate, with each of the second plurality of partitions, one or more interpolated PBs of a second plurality of interpolated PBs. The second plurality of PBs may include multiple interpolated PBs for a given partition. For example, as depicted with the bottom dashed arrow in FIG. 5A, operations that are performed in conjunction with block 540 may be similar to operations of blocks 522 and 524 performed in conjunction with block 520. Specifically, processing the second plurality of partitions may include identifying a plurality of candidate interpolated PBs. Each of the plurality of candidate interpolated PBs may be generated using a respective interpolation mode of a plurality of interpolation modes and based on a set of reference pixels. The reference pixels used in conjunction with block 540 may be reference pixels of the RPG identified at block 530. The one or more circuits may then select the one or more interpolated PBs (top candidates) based on a comparison of pixel values of each of the plurality of candidate interpolated PBs with source pixel values of the image frame. The selection of the top candidates may be facilitated by a suitable choice of a cost function, e.g., SATD cost function, SSD cost function, and the like (which may be the same or different than the cost function used in conjunction with block 520). In some embodiments, N top candidates are chosen for each of the second plurality of partitions (e.g., for each 8×8 pixel block, each 32×16 pixel block, etc.). In some embodiments, additional candidates may be identified for each of the first plurality of partitions (e.g., for each 16×16 pixel block or any other first size).

At block 550, method 500 may continue with the one or more circuits selecting predicted PBs from a plurality of candidate PBs, which may include at least the first plurality of interpolated PBs and the second plurality of interpolated PBs. For example, a top candidate for each block (partition) may be selected from the first plurality of interpolated PBs (e.g., 16×16 interpolated PBs) or the second plurality of interpolated PBs (e.g., PBs of all other sizes). In some embodiments, selecting the predicted PBs may be based on a comparison of the interpolated pixel values of a respective plurality of interpolated PBs with source pixel values of the image frame. Selecting the predicted PBs may be performed using a second cost function that is different than the first cost function (used in identification of the candidate interpolated PBs). In some embodiments, the selection of the predicted PBs may further be performed from some additional plurality of candidate blocks. For example, the plurality of candidate PBs may further include a plurality of inter-frame reference PBs. Each of the plurality of inter-frame reference PBs may correspond to an inter-frame reference PB in one of reference image frames (e.g., previous frames or subsequent frames). In some embodiments, the inter-frame reference PB may be additionally filtered with one or more motion compensation filters. In some embodiments, the inter-frame reference PB may be associated with multiple reference frames, e.g., may be an average of a first inter-frame reference PB of one reference frame (e.g., one of previous reference frames) and a second inter-frame reference PB of another reference frame (e.g., one of subsequent reference frames).

At block 560, method 500 may continue with the one or more circuits creating a representation of the image frame (e.g., producing a codec bitstream) using the interpolated pixel values of the predicted PBs. In some embodiments, creating the representation of the image frame may include a reconstruction of the predicted PBs, which may be performing as described in conjunction with FIG. 5B below.

FIG. 5B is a flow diagram of an example method 501 of reconstruction of predicted PBs for efficient real-time compression encoding of video files, in accordance with at least some embodiments. In some embodiments, method 501 may be performed using multiple hardware processing threads processing various blocks of the image frame. In some embodiments, method 501 may be performed as part of block 560 of method 500 described in conjunction with FIG. 5A above. In some embodiments, method 501 may be performed as part of any other applicable method of video encoding, including but not limited to method 600 described in conjunction with FIG. 6 below. At block 562, one or more circuits performing method 501 may selecting a first predicted PB. The term "first" should be understood as an identifier only and is not implying a specific order. The first predicted PB can be associated with any partition of the image frame being reconstructed. Blocks 564-572 indicate one or more transformations that can be applied by the one or more circuits to the first predicted PB to obtain a reconstructed first PB (associated with the same partition of the image frame).

At block 564, method 501 may continue with the one or more circuits computing a residual difference PB (e.g., residual block 420 of FIG. 4) between the first predicted PB (e.g., final predicted block N 412) and a corresponding source PB (e.g., source block 410). Method 501 may continue with applying, at block 566, an invertible discrete transformation to the computed residual difference PB (e.g., residual block 420) to obtain a transformed residual difference PB (e.g., transformed block 424) and then applying, at block 568, a non-invertible quantization transformation to the transformed residual difference PB to obtain a quantized residual difference PB (e.g., quantized block 426).

At block 570, method 501 may continue with the one or more circuits applying a reverse quantization transformation to the quantized residual difference PB (e.g., quantized block 426) to obtain a reverse quantized residual difference PB (e.g., reverse-quantized transformed block 430) and then applying, at block 572, an inverse discrete transformation to the reverse quantized residual difference PB to obtain the reconstructed first PB (e.g., reconstructed residual block 432). The obtained reconstructed first PB may then be used to obtain, at block 574, a reconstructed second PB (e.g., a reconstructed block that obtained based on the final predicted block N+1 416). The blocks 562-574 may be repeated until all predicted blocks in the image frame are reconstructed.

In addition to reconstructing the predicted blocks, the one or more circuits may identify, at block 580, parameters of one or more filters to be applied by an image decoder to the quantized residual difference PB (e.g., by providing quantized block 426 of FIG. 4 for filter and encoding 428). The identified parameters of the one or more filters may be included in the representation of the image (e.g., encoded into a bitstream that a decoder system is to use for decoding the video file).

FIG. 6 is a flow diagram of another example method 600 of real-time compression encoding of video files using hardware parallel processing, in accordance with at least some embodiments. Method 600 may include parallel and sequential processing of various blocks (partitions) of image frames. The parallel processing may be performed by multiple hardware processing threads. The description below of operations of method 500 is illustrated using an example image (or image frame), but it should be understood that other images of the video files may be processed similarly. One or more circuits performing method 600 may process, at block 610, a first plurality of partitions of an image to identify, for each of the first plurality of partitions, one or more initial interpolation modes of a plurality of interpolation modes of a video codec encoder. In some embodiments, the first plurality of partitions may include partitions of one size (e.g., 16×16 pixels or 32×32 pixels). In some embodiments, the first plurality of partitions may include partitions of multiple sizes (e.g., 16×16 pixels and 32×32 pixels). Likewise, in some embodiments, one initial interpolation mode may be identified for each identified partition, e.g., a specific interpolation mode that approximates the source pixels of the image most accurately. In some embodiments, more than one initial interpolation mode may be identified for each partition (e.g., N best modes).

The processing operations of block 610 may be performed in parallel. In some embodiments, the one or more initial interpolation modes may be applied to source pixels of the first plurality of partitions. In such embodiments, parallel processing 302 of FIG. 3 may be performed first while the initial sequential processing 301 is not performed. Specifically, the RPG that is used for parallel processing may include source pixels as reference pixels. In other implementations, e.g., as described in conjunction with method 500 of FIG. 1A, the RPG may include reference pixels that approximate the source pixels but are preprocessed according to some suitable scheme.

At block 620, method 600 may continue with the one or more circuits associating a preferred interpolation mode with each of a second plurality of partitions of the image. The second plurality of partitions may be the same or different than the first plurality of partitions. Associating the preferred interpolation modes may be performed using the one or more initial interpolation modes identified for each of the first plurality of partitions. As depicted by a dashed block 622, associating, with each of the second plurality of partitions of the image, the respective preferred interpolation mode may include some or all of the following. The one or more circuits performing method 600 may select a size of the respective partition of the second plurality of partitions. The one or more circuits may further select the preferred interpolation mode for the selected size of the partition. Selection of the preferred interpolation mode and/or the size may be done in view of a cost value that characterizes a difference between source pixels of the respective partition and pixels of an interpolated PB generated using the respective preferred interpolation mode.

At block 630, method 600 may continue with the one or more circuits processing sequentially the second plurality of partitions to obtain a plurality of reconstructed pixel blocks (PBs), wherein each reconstructed PB of the plurality of reconstructed PBs is obtained using a respective preferred interpolation mode associated with a respective partition of the second plurality of partitions. More specifically, sequential processing at block 630 may be performed similarly to sequential processing of FIG. 4. At block 640, method 600 may continue with the one or more circuits creating a compressed representation of the image using the plurality of reconstructed PBs of the image. Creating the compressed representation of the image may include some or all operations of method 501 described in conjunction with FIG. 5B.

Images and videos generated applying one or more of the techniques disclosed herein may be displayed on a monitor or other display device. In some embodiments, the display device may be coupled directly to the system or processor generating or rendering the images or videos. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images or videos generated by the system or processor may be streamed over the network to the display device. Such streaming allows, for example, video games or other applications, which render images or videos, to be executed on a server or in a data center and the rendered images and videos to be transmitted and displayed on one or more user devices (such as a computer, video game console, smartphone, other mobile device, etc.) that are physically separate from the server or data center. Hence, the techniques disclosed herein can be applied to enhance the images or videos that are streamed and to enhance services that stream images and videos such as NVIDIA GeForce Now (GFN), Google Stadia, and the like.

Furthermore, images and videos generated applying one or more of the techniques disclosed herein may be used to train, test, or certify deep neural networks (DNNs) used to recognize objects and environments in the real world. Such images and videos may include scenes of roadways, factories, buildings, urban settings, rural settings, humans, animals, and any other physical object or real-world setting. Such images and videos may be used to train, test, or certify DNNs that are employed in machines or robots to manipulate, handle, or modify physical objects in the real world. Furthermore, such images and videos may be used to train, test, or certify DNNs that are employed in autonomous vehicles to navigate and move the vehicles through the real world. Additionally, images and videos generated applying one or more of the techniques disclosed herein may be used to convey information to users of such machines, robots, and vehicles.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
   a memory device to store source pixel values of an image frame; and
   one or more circuits communicatively coupled to the memory device, the one or more circuits to:
   segment the image frame into a first plurality of partitions of a first size;
   associate, with each of the first plurality of partitions, a respective predicted pixel block (PB) of a first plurality of predicted PBs;
   identify, using the first plurality of predicted PBs, a reference pixel grid (RPG) that comprises pixel values of a subset of pixels of the first plurality of predicted PBs;
   segment the image frame into a second plurality of partitions of a second size;
   obtain, using the RPG identified using the first plurality of predicted PBs of the first size, associations of each of the second plurality of partitions with one or more predicted PBs of a second plurality of predicted PBs of the second size, wherein at least two of the associations are obtained in parallel;
   select final predicted PBs from a plurality of candidate PBs, wherein the plurality of candidate PBs comprises the first plurality of predicted PBs and the second plurality of predicted PBs;
   apply one or more transformations to the final predicted PBs to obtain reconstructed PBs; and
   create a representation of the image frame using pixel values of the reconstructed PBs.

2. The system of claim 1, wherein to select the final predicted PBs, the one or more circuits are to use a comparison of the pixel values of a respective plurality of predicted PBs with source pixel values of the image frame.

3. The system of claim 1, wherein to obtain the associations, the one or more circuits are to:

identify a plurality of candidate predicted PBs, each of the plurality of candidate predicted PBs generated using a respective interpolation mode of a plurality of interpolation modes; and select the one or more predicted PBs based on a comparison of pixel values of each of the plurality of candidate predicted PBs with source pixel values of the image frame and using a first cost function.

4. The system of claim 3, wherein the final predicted PBs are selected using a second cost function different from the first cost function.

5. The system of claim 1, wherein the plurality of candidate PBs further comprises a plurality of inter-frame reference PBs, wherein each of the plurality of inter-frame reference PBs corresponds to a reference PB in one or more reference image frames, wherein the final predicted PBs comprise one or more inter-frame reference PBs chosen from the plurality of inter-frame reference PBs, and wherein to create the representation of the image frame, the one or more circuits are to:

select an invertible discrete transformation for each of the chosen one or more inter-frame reference PBs, based on pixel values of a respective inter-frame reference PB.

6. The system of claim 1, wherein to apply the one or more transformations to the final predicted PBs, the one or more circuits are to:

compute a residual difference PB between an individual final predicted PB of the final predicted PBs and a corresponding source PB;

apply an invertible discrete transformation to the computed residual difference PB to obtain a transformed residual difference PB; and apply a non-invertible quantization transformation to the transformed residual difference PB to obtain a quantized residual difference PB.

7. The system of claim 6, wherein to apply the one or more transformations to the final predicted PBs, the one or more circuits are further to:

apply a reverse quantization transformation to the quantized residual difference PB to obtain a reverse quantized residual difference PB; and apply an inverse discrete transformation to the reverse quantized residual difference PB to obtain an individual reconstructed PB of the reconstructed PBs.

8. The system of claim 1, wherein to create the representation of the image frame using the pixel values of the reconstructed PBs, the one or more circuits are to:

identify parameters of one or more filters to be applied by an image decoder to the reconstructed PBs; and include the identified parameters of the one or more filters in the representation of the image frame.

9. A system comprising:

a memory device to store source pixel values of an image; and one or more circuit groups communicatively coupled to the memory device, the one or more circuit groups comprising:

a first circuit group to:

identify, for each of a first plurality of partitions, one or more initial interpolation modes of a plurality of interpolation modes of a video codec encoder;

identify, using the one or more initial interpolation modes, a reference pixel grid (RPG) that comprises pixel values of a subset of pixels of the first plurality of partitions; and associate, using the RPG, with each of a second plurality of partitions of the image, a selected interpolation mode of the plurality of interpolation modes of the video codec encoder; and a second circuit group communicatively coupled to the first circuit group, the second circuit group to:

process the second plurality of partitions to obtain a plurality of reconstructed pixel blocks (PBs), wherein at least some reconstructed PBs of the plurality of reconstructed PBs are obtained using a respective selected interpolation mode associated with a respective partition of the second plurality of partitions; and create a compressed representation of the image using the plurality of reconstructed PBs of the image.

10. The system of claim 9, wherein partitions of the first plurality of partitions have a same size, wherein the second plurality of partitions comprises partitions of multiple sizes, and wherein to associate, with each of the second plurality of partitions of the image, the respective selected interpolation mode, the first circuit group is to:

chose i) the selected interpolation mode and ii) a size of the respective partition of the second plurality of partitions in view of a cost value that characterizes a difference between source pixels of the respective partition and pixels of a predicted PB generated using the respective selected interpolation mode.

11. The system of claim 9, wherein the one or more circuit groups further comprise:

a motion estimation (ME) circuit group communicatively coupled to the first circuit group, the ME circuit group to:

identify, for each of a third plurality of partitions of the image, an inter-frame reference PB corresponding to a reference PB in one or more reference image frames;

and wherein at least some reconstructed PBs of the plurality of reconstructed PBs are obtained using the inter-frame reference PB for a respective partition of the third plurality of partitions.

12. A method comprising:

segmenting an image frame into a first plurality of partitions of a first size;

associating, with each of the first plurality of partitions, a respective predicted pixel block (PB) of a first plurality of predicted PBs;

identifying, using the first plurality of predicted PBs, a reference pixel grid (RPG) that comprises pixel values of a subset of pixels of the first plurality of predicted PBs;

segmenting the image frame into a second plurality of partitions of a second size;

obtain, using the RPG identified using the first plurality of predicted PBs, associations of each of the second plurality of partitions with one or more predicted PBs of a second plurality of predicted PBs, wherein at least two of the associations are obtained in parallel;

selecting final predicted PBs from a plurality of candidate PBs, wherein the plurality of candidate PBs comprises the first plurality of predicted PBs and the second plurality of predicted PBs;

applying one or more transformations to the final predicted PBs to obtain reconstructed final PBs; and creating a representation of the image frame using pixel values of the reconstructed final PBs.

13. The method of claim 12, wherein selecting the final predicted PBs is based on a comparison of the pixel values of a respective plurality of predicted PBs with source pixel values of the image frame.

14. The method of claim 12, wherein obtaining the associations comprises:
identifying a plurality of candidate predicted PBs, each of the plurality of candidate predicted PBs generated using a respective interpolation mode of a plurality of interpolation modes; and
selecting the one or more predicted PB based on a comparison of pixel values of each of the plurality of candidate predicted PBs with source pixel values of the image frame and using a first cost function.

15. The method of claim 14, wherein the final predicted PBs are selected using a second cost function different from the first cost function.

16. The method of claim 12, wherein the plurality of candidate PBs further comprises a plurality of inter-frame reference PBs, wherein each of the plurality of inter-frame reference PBs corresponds to a reference PB in one or more reference image frames.

17. The method of claim 12, wherein applying the one or more transformations to the final predicted PBs comprises:
computing a residual difference PB between an individual final predicted PB of the final predicted PBs and a corresponding source PB;
applying an invertible discrete transformation to the computed residual difference PB to obtain a transformed residual difference PB; and
applying a non-invertible quantization transformation to the transformed residual difference PB to obtain a quantized residual difference PB.

18. The method of claim 17, wherein applying the one or more transformations to the final predicted PBs further comprises:
applying a reverse quantization transformation to the quantized residual difference PB to obtain a reverse quantized residual difference PB; and
applying an inverse discrete transformation to the reverse quantized residual difference PB to obtain an individual reconstructed PB of the reconstructed PBs.

19. The method of claim 12, wherein creating the representation of the image frame using the pixel values of the reconstructed PBs comprises:
identifying parameters of one or more filters to be applied by an image decoder to the reconstructed PBs; and
including the identified parameters of the one or more filters in the representation of the image frame.

\* \* \* \* \*